(12) United States Patent
Popa et al.

(10) Patent No.: US 9,319,644 B2
(45) Date of Patent: Apr. 19, 2016

(54) AUTOMATIC USER BAND ASSIGNMENT IN A SATELLITE SIGNAL DISTRIBUTION ENVIRONMENT

(75) Inventors: Ovidiu Octavian Popa, Richmond Hill (CA); Wayne Scrivens, Newmarket (CA); Alexander Ishankov, Toronto (CA); Alan Dagenais, Stouffville (CA); Tim Dinesen, Scugog (CA); Peter Marusich, Burlington (CA)

(73) Assignee: BCE Inc., Montreal (CA)

( * ) Notice: Subject to any disclaimer, the term of this patent is extended or adjusted under 35 U.S.C. 154(b) by 1466 days.

(21) Appl. No.: 12/643,691

(22) Filed: Dec. 21, 2009

(65) Prior Publication Data

US 2011/0016496 A1 Jan. 20, 2011

Related U.S. Application Data

(60) Provisional application No. 61/226,896, filed on Jul. 20, 2009.

(51) Int. Cl.
*H04N 7/20* (2006.01)
*H04N 21/61* (2011.01)
(Continued)

(52) U.S. Cl.
CPC ............ *H04N 7/20* (2013.01); *H04H 20/38* (2013.01); *H04H 20/63* (2013.01); *H04H 40/90* (2013.01); *H04N 21/436* (2013.01); *H04N 21/437* (2013.01); *H04N 21/61* (2013.01); *H04N 21/6143* (2013.01); *H04N 21/6193* (2013.01); *H04N 21/637* (2013.01); *H04N 21/64* (2013.01); *H04N 21/6402* (2013.01); *H04N 21/647* (2013.01)

(58) Field of Classification Search
USPC ........................................... 725/63
See application file for complete search history.

(56) References Cited

U.S. PATENT DOCUMENTS

| 5,903,878 A | 5/1999 | Talati et al. |
| 6,507,907 B1 | 1/2003 | Takahashi et al. |

(Continued)

FOREIGN PATENT DOCUMENTS

| EP | 1765012 | 3/2007 |
| WO | 2007001287 | 1/2007 |
| WO | 2007027626 | 3/2007 |

OTHER PUBLICATIONS

Entropic Communications, "RF5219 Satellite Channel Stacking Switch (SCSS)", May 2008.

(Continued)

*Primary Examiner* — Justin Shepard
(74) *Attorney, Agent, or Firm* — Growling WLG (Canada) LLP

(57) ABSTRACT

A communications system and method involving a set top box (STB) and a channel stacking switch (CSS). The STB comprises a communications interface configured to issue a request for a user band, the request identifying the STB and further configured to receive a message identifying an assigned user band; and a tuning element configured to tune to the assigned user band in response to receipt of the message. The CSS comprises a communications interface configured to receive the request for a user band identifying the STB; a memory; and a processing entity configured to access the memory to identify a particular user band that is available for the STB and to assign the particular user band to the STB; wherein the communications interface is further configured to issue to the STB a message identifying the particular user band assigned to the STB.

26 Claims, 3 Drawing Sheets

(51) Int. Cl.

| | | |
|---|---|---|
| H04N 21/436 | (2011.01) | |
| H04N 21/647 | (2011.01) | |
| H04N 21/437 | (2011.01) | |
| H04N 21/637 | (2011.01) | |
| H04N 21/64 | (2011.01) | |
| H04N 21/6402 | (2011.01) | |
| H04H 20/38 | (2008.01) | |
| H04H 20/63 | (2008.01) | |
| H04H 40/90 | (2008.01) | |

(56) References Cited

U.S. PATENT DOCUMENTS

| | | | |
|---|---|---|---|
| 6,904,522 B1 | 6/2005 | Benardeau et al. | |
| 7,039,802 B1 | 5/2006 | Eskicioglu et al. | |
| 7,130,576 B1 | 10/2006 | Gurantz et al. | |
| 7,542,715 B1 | 6/2009 | Gurantz et al. | |
| 7,712,120 B2 | 5/2010 | Nadarajah et al. | |
| 7,930,712 B1 | 4/2011 | Joseph et al. | |
| 7,941,091 B1 | 5/2011 | Doherty et al. | |
| 2003/0061477 A1 | 3/2003 | Kahn et al. | |
| 2003/0081774 A1 | 5/2003 | Lin et al. | |
| 2004/0091114 A1 | 5/2004 | Carter et al. | |
| 2004/0148632 A1* | 7/2004 | Park et al. | 725/81 |
| 2005/0050333 A1 | 3/2005 | Yeap et al. | |
| 2006/0018345 A1 | 1/2006 | Nadarajah et al. | |
| 2006/0098819 A1 | 5/2006 | Zeng et al. | |
| 2006/0141963 A1* | 6/2006 | Maxim et al. | 455/192.1 |
| 2006/0225098 A1* | 10/2006 | James et al. | 725/63 |
| 2007/0133780 A1* | 6/2007 | Berner et al. | 379/265.01 |
| 2007/0250909 A1 | 10/2007 | James et al. | |
| 2007/0266241 A1 | 11/2007 | Wu et al. | |
| 2008/0059646 A1* | 3/2008 | Ludvig et al. | 709/231 |
| 2008/0307465 A1* | 12/2008 | Wu | 725/68 |
| 2008/0307474 A1* | 12/2008 | Muth et al. | 725/104 |
| 2009/0232077 A1* | 9/2009 | Krieger et al. | 370/329 |
| 2009/0290711 A1 | 11/2009 | Bloom et al. | |
| 2010/0169938 A1 | 7/2010 | Nadarajah et al. | |

OTHER PUBLICATIONS

Satellite Signals, "Satellite LNB: What is it, how does it work and where do I buy one?, Low noise block downconverter (LNB)", http://www.satsig.net/lnb/explanation-description-lnb.htm, Jul. 15, 2009.
European Telecommunications Satellite Organization (EUTELSAT), "Digital Satellite Equipment Control (DiSEqC™), Bus Functional Specification Version 4.2", Organisation européenne de télécommunications par satellite, Feb. 25, 1998, 28 pages.
Wikipedia, The Free Encyclopedia, "Low-noise block converter", http://en.wikipedia.org/wiki/Low-noise_block_converter, Jul. 15, 2009.
Ploof, Mike et al. "Channel stacking switch technology for residential DBS reduces cabling and STBs", EE Times-India, Nov. 2007, 5 pages.
Entropic Communications, "DBS Outdoor Unit Solutions", http://www.entropioc.com/technology/dbssolutions.htm, downloaded on May 13, 2011, 1 page.
International Search Report mailed on Oct. 12, 2010 in connection with International Patent Application Serial No. PCT/CA2010/001131, 3 pages.
Written Opinion of the International Searching Authority mailed on Oct. 12, 2010 in connection with International Patent Application Serial No. PCT/CA2010/001131, 5 pages.
International Search Report mailed on Nov. 4, 2010 in connection with International Patent Application Serial No. PCT/CA2010/001132, 5 pages.
Written Opinion of the International Searching Authority mailed on Nov. 4, 2010 in connection with International Patent Application Serial No. PCT/CA2010/001132, 8 pages.
International Search Report mailed on Oct. 29, 2010 in connection with International Patent Application Serial No. PCT/CA2010/001130, 3 pages.
Written Opinion of the International Searching Authority mailed on Oct. 29, 2010 in connection with International Patent Application Serial No. PCT/CA2010/001130, 6 pages.
Mike Ploof et al., "Channel stacking switch technology for residential DBS reduces cabling and STBs", Nov. 16, 2007, EE Times-India, www.eetindia.com, 5 pages.
U.S. Appl. No. 61/288,631, filed Dec. 21, 2009 (no copy enclosed).
U.S. Appl. No. 12/643,400, filed Dec. 21, 2009 (no copy enclosed).
Non-Final Office Action issued by the United States Patent and Trademark Office on Sep. 5, 2012 in connection with U.S. Appl. No. 12/643,400, 10 pages.
Final Office Action mailed on Jun. 2, 2014 in connection with U.S. Appl. No. 13/517,498, 13 pages.
Extended European Search Report mailed on Jun. 12, 2014 in connection with International Patent Application PCT/CA2010/001132, 143 pages.
Non-Final Office Action issued by the United States Patent and Trademark Office on Nov. 18, 2013 in connection with U.S. Appl. No. 12/643,400, 15 pages.
Non-Final Office Action issued by the United States Patent and Trademark Office on Nov. 26, 2013 in connection with U.S. Appl. No. 13/517,498, 13 pages.
Non-Final Office Action issued by the United States Patent and Trademark Office on May 23, 2013 in connection with U.S. Appl. No. 12/643,400, 11 pages.

* cited by examiner

AUTOMATIC USER BAND ASSIGNMENT IN A SATELLITE SIGNAL DISTRIBUTION ENVIRONMENT

CROSS-REFERENCE TO RELATED APPLICATION

The present application claims the benefit under 35 USC §119(e) of U.S. Provisional Patent Application Ser. No. 61/226,896 to Popa et al., filed Jul. 20, 2009, hereby incorporated by reference herein.

FIELD OF THE INVENTION

The present invention relates generally to an environment for distributing satellite signals to a plurality of set top boxes and, more particularly, to methods and systems for user band assignment in such an environment.

BACKGROUND

Channel stacking switch (CSS) technology reduces set top box (STB) installation costs and complexity, by requiring only one cable drop per STB, even if the receiver (i.e., the STB) has multiple tuners. The interested reader can find more information about channel stacking switches and their applications in the document entitled "Channel Stacking Switch Technology for Residential DBS Reduces Cabling and STBs", by M. Ploof, P. Wong and T. Brandon, EE Times-India (www.eetindia.com), November 2007. This document is hereby incorporated herein by reference.

Generally speaking, the CSS provides a plurality of User Bands (UBs) between itself and one or more STBs. A single-tuner STB is assigned one of the user bands and a dual-tuner STB is assigned two of the user bands. The use of a CSS to distribute satellite signals to a group of STBs thus becomes an economical choice when upgrades are envisaged, such as in a single family home when multiple viewing areas are required, and in multi-dwelling units (MDUs).

The EN50495 European Standard, hereby incorporated by reference herein, describes a system for distributing, via a single coaxial cable, signals issued in different satellite frequency bands and having different polarizations to a plurality of STBs. This system is based on the EN61319-1/A11 Digital Satellite Equipment Control Bus specification (frequently referred to as DiSEgC™) in its 1.0 version, also hereby incorporated by reference herein. The EN50495 European Standard describes a user band assignment procedure that relies on a pre-existent configuration defined at installation time, by manually assigning a user band to each STB in a specially designed user interface screen.

This conventional method of assigning user bands has at least three major disadvantages. Firstly, it is an inconvenient procedure to be performed by the installer during the original truck roll and each time a new receiver is added to the system. Due to the highly specialized work required, it is unlikely that customers will be able (or willing) to do this type of work by themselves. Also, the requirement to keep user bands unique implicitly assumes knowledge of previous user band assignments in the same home; this adds time and cost to the overall installation process.

Secondly, for practical reasons, a CSS unit may have multiple output ports, each handling a subset of user bands. Moving a receiver to another port requires re-assigning a user band, otherwise the receiver won't work. This again would potentially require the on-site presence of a technician and could be the source of significant customer dissatisfaction.

Thirdly, a critical failure condition (e.g. a power outage) may require a manual reconfiguration for one or more receivers in the entire system. This is again a very inconvenient process, and rolling trucks after a power outage is not something that both customers and signal distribution companies would enjoy.

Against this background, it is clear that the industry is in need of an improved user band assignment methodology.

SUMMARY

A first broad aspect of the present invention seeks to provide a method of communication involving a set top box (STB) and a channel stacking switch (CSS), comprising: the STB issuing a request for a user band, the request identifying the STB; the CSS receiving the request identifying the STB; the CSS consulting a memory to identify a particular user band that is available for the STB; the CSS assigning the particular user band to the STB; the CSS issuing a message identifying the particular user band; the STB receiving the message identifying the particular user band; the STB tuning to the particular user band.

A second broad aspect of the present invention seeks to provide a system comprising: a set top box (STB) configured to issue a request for a user band, the request identifying the STB; and a channel stacking switch (CSS) configured to receive the request identifying the STB, consult a memory to identify a particular user band that is available for the STB, assign the particular user band to the STB and issue a message identifying the particular user band; wherein the STB is further configured to tune to the particular user band in response to receipt of the message.

A third broad aspect of the present invention seeks to provide a method implemented by a set top box (STB), comprising: issuing a request for a user band, the request identifying the STB; receiving a message identifying an assigned user band; tuning to the assigned user band in response to receipt of the message.

A fourth broad aspect of the present invention seeks to provide a set top box (STB), comprising: a communications interface configured to (i) issue a request for a user band, the request identifying the STB and (ii) receive a message identifying an assigned user band; a tuning element configured to tune to the assigned user band in response to receipt of the message.

A fifth broad aspect of the present invention seeks to provide a computer-readable storage medium storing instructions for execution by a set top box (STB), wherein execution of the instructions by the STB cause the STB to: issue a request for a user band, the request identifying the STB; respond to receipt of a message identifying an assigned user band by tuning to the assigned user band.

A sixth broad aspect of the present invention seeks to provide a method implemented by a channel stacking switch, comprising: receiving a request for a user band identifying a set top box (STB); consulting a memory to identify a particular user band that is available for the STB; assigning the particular user band to the STB; issuing a message identifying the particular user band.

A seventh broad aspect of the present invention seeks to provide a channel stacking switch, comprising: a communications interface configured to receive a request for a user band identifying a set top box; a memory; a processing entity configured to access the memory to identify a particular user band that is available for the set top box and to assign the particular user band to the set top box; the communications interface being further configured to issue a message identifying the particular user band.

An eighth broad aspect of the present invention seeks to provide a computer-readable storage medium storing instructions for execution by a channel stacking switch (CSS), wherein execution of the instructions by the CSS cause the CSS to: respond to receipt of a request for a user band identifying a set top box (STB) by accessing a memory to identify a particular user band that is available for the STB and to assign the particular user band to the STB; issue a message identifying the particular user band.

These and other aspects and features of the present invention will now become apparent to those of ordinary skill in the art upon review of the following description of specific embodiments of the invention in conjunction with the accompanying drawings.

It is to be expressly understood that the description and drawings are only for the purpose of illustration of certain embodiments of the invention and are an aid for understanding. They are not intended to be a definition of the limits of the invention.

DESCRIPTION

Embodiments of the present invention provide a method of assigning one or more unique user bands to one or more set top boxes (STBs) in a satellite signal distribution environment. If a STB has a single tuner, then a single unique user band is assigned to the STB; if the STB has multiple tuners, then multiple unique user bands are assigned to the STB.

The term "set top box" is not intended to be limited to a particular hardware configuration, but rather is meant to encompass receivers that are capable of processing a signal received from an external source for delivery to a display set for conveyance to a user. The term "processing" is meant to encompass one or more of filtering, decoding, descrambling, demultiplexing and downconverting the received signal. The display set can include a television set, a computer monitor and/or a mobile device, to name a few non-limiting possibilities.

Figure 1:
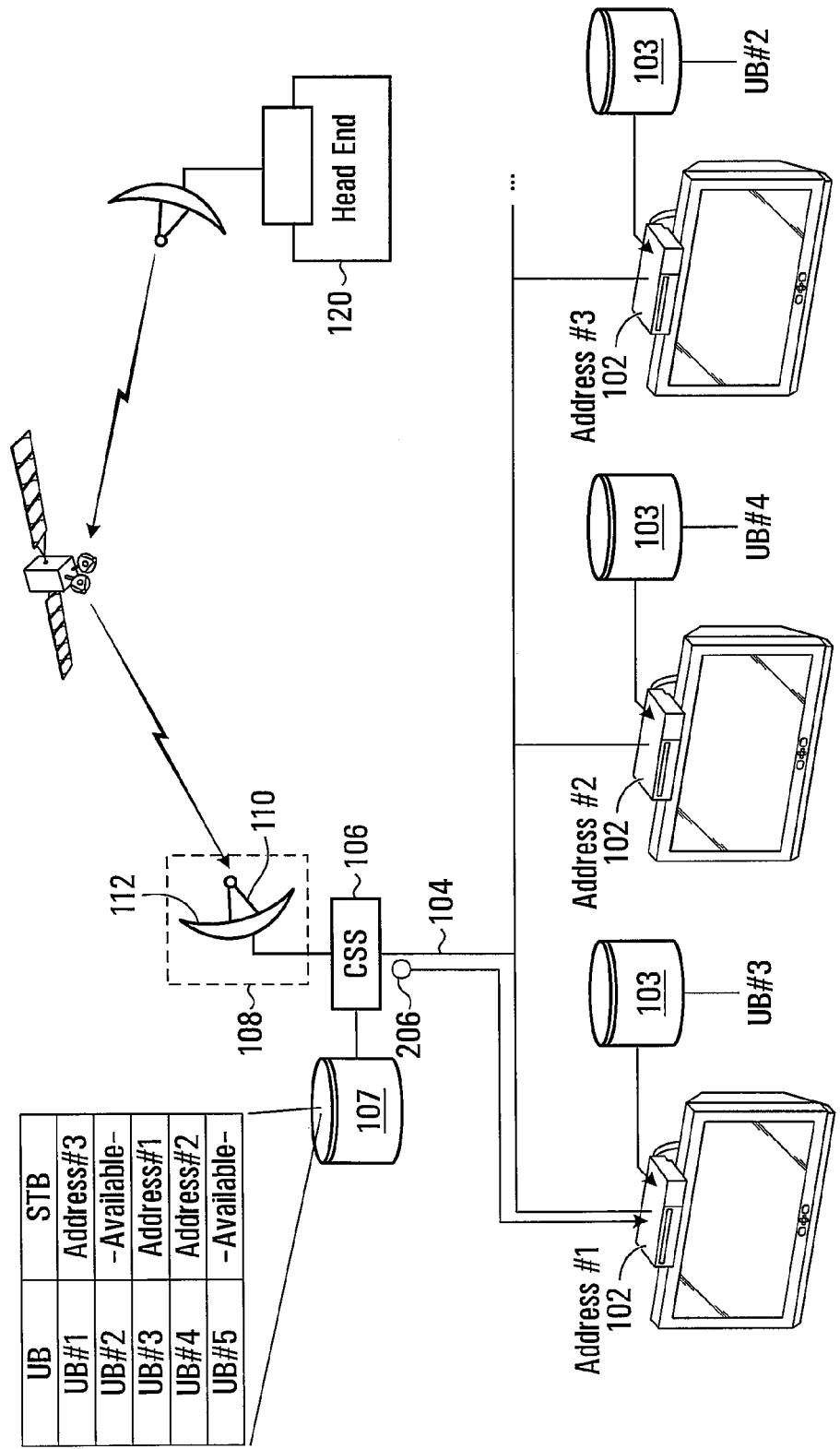
FIG. 1 is a block diagram of a satellite signal distribution environment involving a channel stacking switch and a plurality of set top boxes.

Reference is made to FIG. 1, which shows a satellite signal distribution environment. In the illustrated environment, multiple set top boxes (STBs) 102 communicate over a cable 104 with an outdoor unit, in this case illustrated as a Channel Stacking Switch (CSS) 106. To this end, the STBs 102 and the CSS 106 each have a respective communications interface and a respective processing entity.

The cable 104 supports communication over a frequency range that may be L-band (950 MHz to 2150 MHz), without being limited thereto. This frequency range is divided into "user bands". Each STB 102 has a unique user band assigned to that STB 102, or in the case of a multi-tuner STB, several user bands may be assigned to the STB 102 but each is uniquely assigned to each tuner. For the sake of simplicity, but without limiting the present invention, single-tuner STBs are discussed for the most part herein below. Using user bands that are, say, 30 MHz wide including guard bands, it will be appreciated that the number of STBs that may be supported by a single CSS 106 will be sufficient for many installation environments. A reverse channel may also exist to permit upstream communication (i.e., from the STBs 102 to the CSS 106). In various embodiments, the reverse channel may be a separate frequency channel, a tone that is modulated, etc. It is even envisaged that a separate cable may be used for the reverse channel.

Each STB 102 includes a memory 103 (e.g., flash memory or any other type of non-volatile storage media) that indicates its assigned user band, thus allowing the STB 102 to utilize the correct central frequency when receiving signals from the CSS 106 along the cable 104.

The CSS 106 includes or has access to a memory 107 (e.g., flash memory or any other type of non-volatile storage media) in which it stores the assignment of user bands to STBs 102. The STBs 102 may be identified by serial number and, where a multi-tuner STB is concerned, an extension uniquely identifying each tuner. Other ways of identifying the STBs 102 are of course possible, including various forms of codes and addresses. The memory 107 may be part of the CSS 106 or accessible thereto via a data network such as the Internet.

It should also be appreciated that multiple STBs can be made to share access to the cable 104 by cable splitting (i.e., physically and electrically interconnecting them in parallel), although it is envisaged that other access architectures are possible, which may or may not utilize switching nodes.

It should also be appreciated that the CSS 106 may have a plurality of ports associated with respective non-overlapping portions of the overall frequency range supported by the cable 104. Thus, communication over a particular user band will occur via a port whose identity depends on the portion of the overall frequency range that includes the center frequency of the particular user band. The CSS 106 may be equipped with frequency division multiplexing circuitry to allow multiple ports to hare the same cable 104.

The STBs 102 are connected to display sets viewed by viewers. The display sets could be television sets, computer monitors, wireless communication devices or a combination thereof. The STBs 102 perform video decoding and other functions, including receiving an indication of the channel that a viewer wants to watch. In particular, the STBs 102 generate tuning requests based on channels identified by viewers. Specifically, a channel identified by a viewer (e.g., via a remote control device or by pressing a button on the display set) is mapped into a desired satellite transponder channel by a given STB 102. The desired satellite transponder channel is identified in a tuning request sent to the CSS 106 over the cable 104 in accordance with a format, which can be the DiSEgC™ format (without being limited thereto). The tuning request can be sent over the reverse channel (e.g., using a separate frequency band reserved for upstream communication, one or more DiSEgC™ tone frequencies, a separate cable, etc.) from the STBs 102 to the CSS 106.

Figure 2:
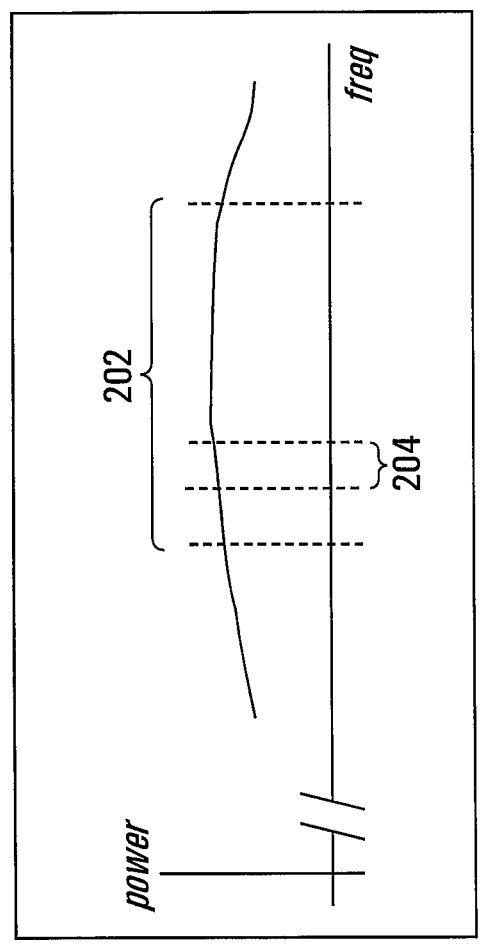
FIG. 2 is a spectral diagram showing a wideband satellite signal containing a desired satellite transponder channel to be isolated by the channel stacking switch on request from a given set top box.

The CSS 106 is responsible for receiving tuning requests from STBs 102 and processing the requests. Specifically, the CSS 106 determines where in the satellite frequency range the desired satellite transponder channel is located. A mapping (e.g., in the memory 107) could be consulted to this effect in order to identify a target wideband satellite frequency range. Then, the CSS 106 provides a satellite feed unit 108 (e.g., a low noise block downconverter 110, which is connected to a satellite dish 112) with a control signal. With additional reference to FIG. 2, the control signal allows the satellite feed unit 108 to admit a wideband satellite signal 202 to the CSS 106, such signal occupying the target wideband satellite frequency range. Examples of parameters that can be controlled by the CSS 106 include the polarization and frequency range of the admitted wideband satellite signal 202. Further information regarding an example manner of controlling a low noise block downconverter can be found in the document entitled "Low Noise Block Downconverter" from Satellite Signals Limited, available at www.satsig.net/lnb/explanation-description-lnb.htm. This document is hereby incorporated by reference herein.

Next, the CSS 106 isolates the desired satellite transponder channel 204 within the wideband satellite signal 202. This can be done by translating in the frequency domain the desired satellite transponder channel 204 to the user band (i.e., the tuner central frequency) assigned to the STB 102 that originated the tuning request. A surface acoustic wave (SAW) filter can be used for this purpose. The resulting signal, denoted 206, is sent to the STB 102. In particular, the signal 206 is "stacked" (i.e., frequency multiplexed) with other signals destined for other STBs. These are all sent together and each individual STB will know which signal to consider, based on its own user band, which is uniquely assigned.

Thus, it will be appreciated that in such a configuration, the tuner in a given STB 102 does not need to change its tuner central frequency during normal operation. Rather, it is the CSS 106 that takes over the tuning function, mapping a desired satellite transponder channel to each tuner's central frequency. As a result, the CSS 106 has to handle N STB tuner central frequencies, where N is the number of STBs connected to the CSS 106, assuming they are single-tuner STBs. Again, it is recalled that these N STB tuner central frequencies are called user bands.

In accordance with a specific non-limiting embodiment of the present invention, a method is provided for assigning the user bands to the STBs 102. The method can be triggered in particular after a cold boot, such as automatically happens after a power outage or when the user disconnects the STB 102 from the mains, looking to move the STB 102 to another port of the CSS 106. Thus, the present method will allow the CSS 106 and the STBs 102 to recover gracefully from a critical failure condition. Alternatively or in addition, the present method can be triggered upon receipt of a command from a head end 120 (decoded by the STB 102 and sent back to the CSS 106 over the cable 104) to clear the memory 103 in the CSS 106, or upon the detection of any other condition as dictated by operational requirements. When discussing the method, it is to be understood that logical decisions are made by the respective processing entities of the STB 102 and the CSS 106, leading to the exchange of messages, requests and other signals via the respective communications interfaces of the STB 102 and the CSS 106.

It is assumed that the CSS 106 and the STBs 102 are enabled to communicate with each other. To this end, the EUTELSAT DiSEgC™ 2.0 Bus Specification v. 4.2 can be used. The EUTELSAT DiSEgC™ 2.0 Bus Specification v. 4.2 describes a two way communication protocol between a satellite STB and an outdoor unit (ODU). However, it should be appreciated that other versions of the DiSEqC specification, as well as other protocols, including proprietary ones, can be used without departing from the scope of the present invention.

Figure 3:
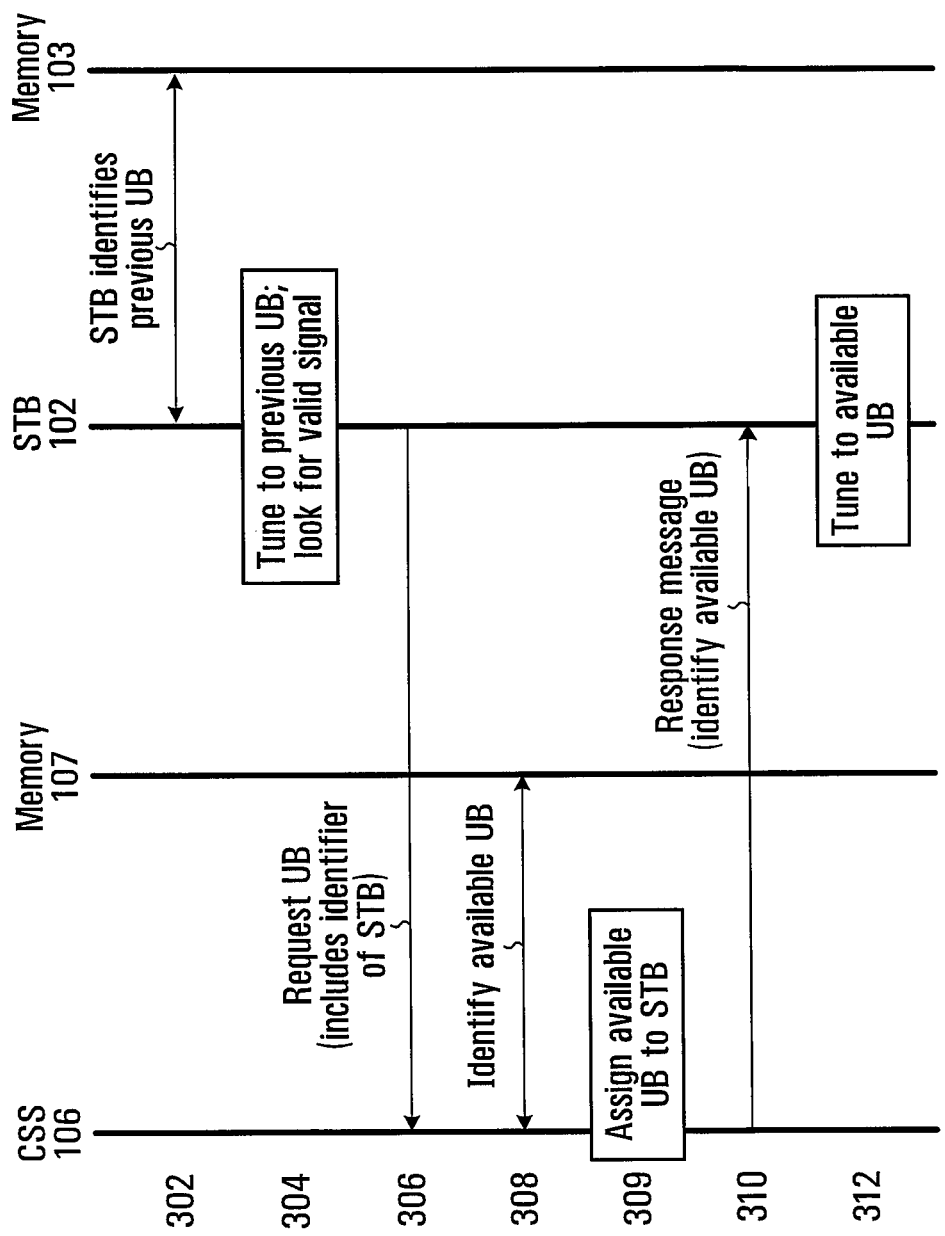
FIG. 3 is a signal flow diagram showing a method for user band assignment carried out by the channel stacking switch and the given set top box.

It is now assumed that the method has been triggered. As has been explained, the method can be triggered pursuant to a cold boot of the STB 102. Alternatively or in addition, the method can be triggered in response to the STB 102 issuing a special command to the CSS 106 that would cause a full reset of the data tables in the CSS 106. This is to maintain the ability for the head end 120 to control the user band assignment process (via the STB 102) and to eventually be able to reset the entire configuration. Such a reset would also trigger the below process, described with reference to FIG. 3.

At step 302, the STB 102 consults the memory 103 to identify, if possible, the user band assigned to it prior to the method having been triggered.

At step 304, the STB 102 tunes to this prior user band and looks for a valid RF signal. If the CSS 106 is still using the same user band for STB 102 as it was before, then the STB 102 should be able to detect, from the signal received on the cable 104, a valid RF signal on this prior user band. If no valid signal is received (which could occur, for example, in the event of, among other possibilities, the STB 102 being moved to a different CSS port, occurrence of a critical data corruption in the internal tables, occurrence of a general power outage that affects the STB 102 and the CSS 106, the head end 120 deciding to remotely revoke/change the existing user band assignment, etc.), then the STB 102 proceeds to the beginning of a user band assignment procedure.

In particular, at step 306, the STB 102 issues a request for a user band to the CSS 106. This can be done by way of a command code (e.g., through a legitimate extension in the DiSEqC 2.0 specification, among other possibilities). The request for a user band can be sent over the reverse channel (e.g., using a separate frequency band reserved for upstream communication, one or more DiSEgC™ tone frequencies, a separate cable, etc.) from the STBs 102 to the CSS 106. The request sent at step 306 can be in the form of a packet made up of data bytes. The data bytes carry a unique identifier of the STB 102 (or, in the case of a multi-tuner STB, the identity of each tuner). The identifier of the STB 102 can be in the form of a MAC address, serial number, or any other conceivable type of identifier or address that will allow individual STBs to be uniquely identified. In particular, this can be the unique STB hardware ID (IRD number) or a smart card number, for example.

At step 308, upon receipt of the request for a user band, the CSS 106 processes the request. Specifically, the CSS 106 checks the memory 107 (which, it is recalled, contains the assignment of user bands to STBs). Specifically, the CSS 106 identifies an "available" user band, i.e., one that is not assigned to another STB. The list of candidate user bands (i.e., from which a user band available for the STB 102 can be chosen) is assumed to be known to the CSS 106, and is a function of bandwidth considerations on the channel 104. It is assumed for the sake of simplicity that an available user band does exist; if it does not, this would imply that the system capacity is saturated.

At step 309, the CSS 106 assigns the available user band to the STB 102. It should be appreciated that one possibility is that none of the user bands listed in the CSS memory 107 is, at the time of executing step 308, already assigned to the STB 102. In such a scenario, the CSS 106 updates the memory 107 to indicate that the "available" user band is not available any more, and that it is now assigned to the STB 102, by associating the (formerly) available user band with the identifier of the STB 102.

However, another possibility is that at the time of executing step 308, the memory 107 does in fact indicate that a user band was already assigned to the STB 102, but for any of a number of reasons, this previously assigned user band was not the one (if any) identified by the STB 102 at step 302. Under such circumstances, the user band considered to be "available" can be the previously assigned user band, or it can be an entirely "fresh" user band not currently assigned to any STB. In the former case, the information in the memory 107 does not need to change, while in the latter case, the memory 107 is updated so that the "fresh" user band is assigned to the STB 102 and the previously assigned user band is unassigned to STB 102, i.e., it becomes available for other STBs.

At step 310, the CSS 106 issues a response message to the STB 102 (e.g., in the form of a DiSEqC 2.0 response packet, among other possibilities) and identifies to the STB 102 the user band assigned at step 309. In specific non-limiting examples, this user band can be identified by its actual frequency characteristics (e.g., center frequency), by a code or by an index.

At step 312, the STB 102 receives and processes the response from the CSS 106 and retrieves the identifier of the assigned user band, i.e., the user band that was found by the CSS 106 to have been available at step 308. The STB 102 then identifies the parameters it needs to tune to this user band. If an index was used to identify the assigned user band, then a memory (e.g., the memory 103) is consulted, such memory having been pre-populated with indexes and corresponding user band parameters.

It is noted that tuning requests (such as EN50495 compliant tuning requests) can now resume in a routine fashion, namely they can occur over the reverse channel (e.g., using a separate frequency band reserved for upstream communication, one or more DiSEgC™ tone frequencies, a separate cable, etc.).

Thus, it will be appreciated that the procedure outlined herein assists in automating the configuration of the receiver/CSS during and after installation at a customer site. The need for truck rolls after installation is reduced, and self-installation of additional STBs is facilitated. The procedure also obviates the need to keep track of the current configurations, either at the end user or head end 120. Moreover, the system is able to recover after a critical event, which can reduce post-installation costs.

Those skilled in the art will appreciate that in some embodiments, the STBs 102 and/or the CSS 106 may be implemented using one or more computing apparatuses that have access to a code memory (not shown) which stores computer-readable program code (instructions) for operation of the one or more computing apparatuses. The computer-readable program code could be stored on a medium which is fixed, tangible and readable directly by the one or more computing apparatuses, (e.g., removable diskette, CD-ROM, ROM, fixed disk, USB drive), or the computer-readable program code could be stored remotely but transmittable to the one or more computing apparatuses via a modem or other interface device (e.g., a communications adapter) connected to a network (including, without limitation, the Internet) over a transmission medium, which may be either a non-wireless medium (e.g., optical or analog communications lines) or a wireless medium (e.g., microwave, infrared or other transmission schemes) or a combination thereof. In other embodiments, the STBs 102 and/or the CSS 106 may be implemented using pre-programmed hardware or firmware elements (e.g., application specific integrated circuits (ASICs), electrically erasable programmable read-only memories (EEPROMs), flash memory, etc.), or other related components.

Certain adaptations and modifications of the described embodiments can be made. Therefore, the above discussed embodiments are to be considered illustrative and not restrictive. Also it should be appreciated that additional elements that may be needed for operation of certain embodiments of the present invention have not been described or illustrated as they are assumed to be within the purview of the person of ordinary skill in the art. Moreover, certain embodiments of the present invention may be free of, may lack and/or may function without any element that is not specifically disclosed herein.

What is claimed is:

1. A method of communication involving a set top box (STB) and a channel stacking switch (CSS), comprising, after a cold boot or memory reset command:
   the STB accessing an STB memory to determine a user band in use prior to the cold boot or memory reset command;
   the STB tuning to the prior user band and determining presence or absence of a valid signal from the CSS;
   responsive to determining the absence of a valid signal, the STB issuing a request for a user band, the request identifying the STB;
   the CSS receiving the request identifying the STB;
   the CSS consulting a CSS memory to identify a particular user band that is available for the STB;
   the CSS assigning the particular user band to the STB;
   the CSS issuing a message identifying the particular user band;
   the STB receiving the message identifying the particular user band;
   the STB tuning to the particular user band.

2. The method defined in claim 1, further comprising, after receiving the message identifying the particular user band, the STB updating the STB memory to indicate that the particular user band is in use by the STB.

3. The method defined in claim 1, further comprising the CSS receiving the memory reset command.

4. The method defined in claim 3, wherein the memory reset command is received from the STB.

5. The method defined in claim 3, wherein the memory reset command is received from a head end via a satellite feed unit.

6. The method defined in claim 3, wherein the memory reset command is received from the STB after the STB received it from the CSS and the CSS received it from a head end via a satellite feed unit.

7. The method defined in claim 1, further comprising:
   a second STB issuing a request for a user band, the request identifying the second STB;
   the CSS receiving the request identifying the second STB;
   the CSS consulting the CSS memory to identify a user band that is available for the second STB, the user band that is available for the second STB being a second user band different from the particular user band;
   assigning the second user band to the second STB;
   the CSS issuing a message identifying the second user band;
   the second STB receiving the message identifying the second user band;
   the second STB tuning to the second user band.

8. The method defined in claim 1, further comprising the STB issuing a tuning request to the CSS, the request identifying a desired satellite transponder channel.

9. The method defined in claim 8, further comprising the CSS receiving the tuning request, controlling a satellite feed unit to isolate from an ambient signal a wideband satellite signal, isolating the desired satellite transponder channel from the wideband satellite signal and frequency translating the desired satellite transponder channel into the particular user band.

10. The method defined in claim 9, wherein the satellite feed unit comprises at least one low noise block downconverter.

11. The method defined in claim 9, wherein controlling the satellite feed unit comprises setting a polarization of the wideband satellite signal.

12. The method defined in claim 9, wherein controlling the satellite feed unit comprises setting a frequency range of the wideband satellite signal.

13. The method defined in claim 9, further comprising deriving the desired satellite transponder channel from a user-generated television channel request.

14. The method defined in claim 1, wherein the request and the message are in compliance with at least one version of the DiSEgC™ protocol.

15. The method defined in claim 1, wherein the particular user band occupies one out of a plurality of sub-bands in the frequency range between 950 MHz and 2150 MHz.

16. The method defined in claim 1, wherein the CSS memory stores a plurality of candidate user bands, each of which is either assigned or not assigned to a respective set top box, wherein the CSS consulting the memory to identify the particular user band comprises the CSS selecting the particular user band from among the candidate user bands not assigned to any set top box.

17. The method defined in claim 16, the STB being a first STB, wherein the assigning comprises updating the CSS memory to indicate that the particular user band is assigned to the first STB, thereby to render the particular user band unavailable to any set top box other than the first STB.

18. The method defined in claim 1, the STB being a first STB, wherein the CSS memory stores a plurality of candidate user bands, each of which is either assigned or not assigned to a respective set top box, wherein the CSS consulting the CSS memory to identify the particular user band comprises the CSS selecting the particular user band from among the candidate user bands not assigned to any set top box other than the first STB.

19. The method defined in claim 18, wherein the assigning comprises the CSS updating the CSS memory to indicate that the particular user band is assigned to the first STB, thereby to render the particular user band unavailable to any set top box other than the first STB.

20. The method defined in claim 1, the STB being a first STB, wherein the CSS memory stores a plurality of candidate user bands, each of which is either assigned or not assigned to a respective set top box, wherein when a given one of the candidate user bands was already assigned to the first STB, the assigning comprises the CSS setting the particular user band to be the given one of the candidate user bands.

21. The method defined in claim 1, the STB being a first STB, wherein the CSS memory stores a plurality of candidate user bands, each of which is either assigned or not assigned to a respective set top box, wherein when a given one of the candidate user bands was already assigned to the first STB, the assigning comprises the CSS selecting the particular user band from among the candidate user bands other than the given one of the candidate user bands.

22. The method defined in claim 21, the assigning further comprising the CSS updating the CSS memory to indicate that the particular user band is assigned to the first STB and to indicate that the given one of the user bands is not assigned to any set top box, thereby to render the particular user band unavailable to any set top box other than the first STB and to render the given one of the user bands available to any set top box.

23. A system comprising:
a set top box (STB) configured for, after a cold boot or memory reset command:
    accessing an STB memory to determine a user band in use prior to the cold boot or memory reset command;
    tuning to the prior user band and determining presence or absence of a valid signal from a channel stacking switch; and
    responsive to determining the absence of a valid signal, issuing a request for a user band, the request identifying the STB; and
a channel stacking switch (CSS) configured to receive the request identifying the STB, consult a CSS memory to identify a particular user band that is available for the STB, assign the particular user band to the STB and issue a message identifying the particular user band;
wherein the STB is further configured to tune to the particular user band in response to receipt of the message.

24. A method implemented by a set top box (STB), comprising, after a cold boot or memory reset command:
the STB accessing a memory to determine a user band in use prior to the cold boot or memory reset command;
the STB tuning to the prior user band and determining presence or absence of a valid signal from the CSS;
responsive to determining the absence of a valid signal, issuing a request for a user band, the request identifying the STB;
receiving a message identifying an assigned user band;
tuning to the assigned user band in response to receipt of the message.

25. A set top box (STB), comprising:
a computing apparatus configured for, after a cold boot or memory reset command, accessing a memory to determine a user band in use prior to the cold boot or memory reset command;
a tuning element configured to tune to the prior user band; and
a communications interface;
wherein the computing apparatus is further configured to determine presence or absence of a valid signal from a channel stacking switch and, responsive to determining the absence of a valid signal, to cause the communications interface to issue a request for a user band, the request identifying the STB;
wherein the communications interface is further configured to receive a message identifying an assigned user band; and
wherein the tuning element is further configured to tune to the assigned user band in response to receipt of the message.

26. A non-transitory computer-readable storage medium storing instructions for execution by a set top box (STB), wherein execution of the instructions by the STB after a cold boot or memory reset command cause the STB to:
access a memory to determine a user band in use prior to the cold boot or memory reset command;
tune to the prior user band and determine presence or absence of a valid signal from a channel stacking switch;
responsive to determining the absence of a valid signal, issue a request for a user band, the request identifying the STB;
respond to receipt of a message identifying an assigned user band by tuning to the assigned user band.

* * * * *